No. 854,055. PATENTED MAY 21, 1907.
L. G. QUACKENBOSS.
DETACHABLE BAY WINDOW.
APPLICATION FILED JUNE 22, 1904.
5 SHEETS—SHEET 2.
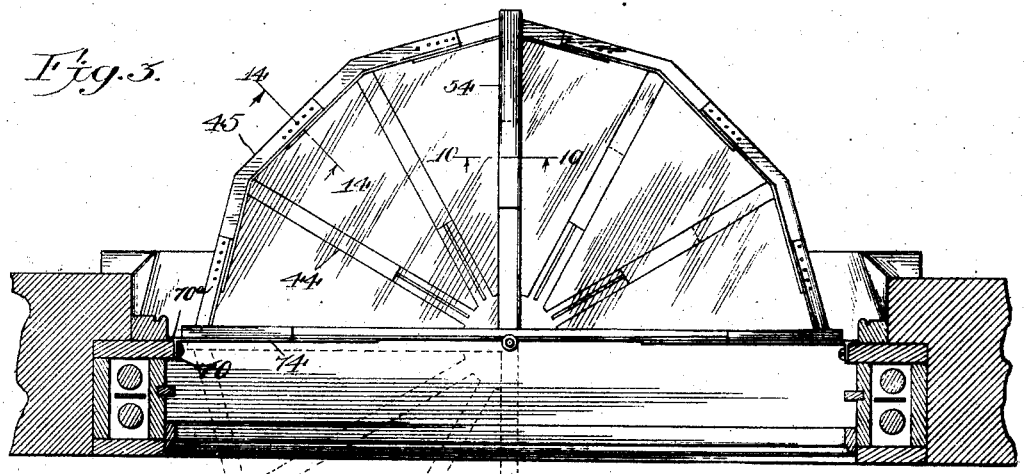
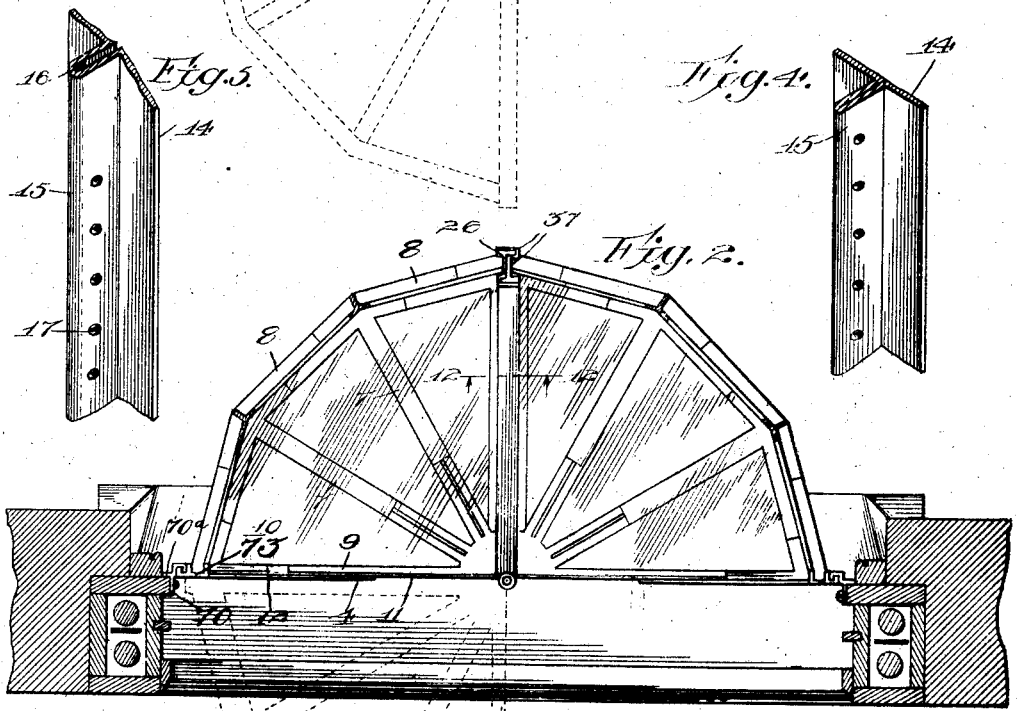

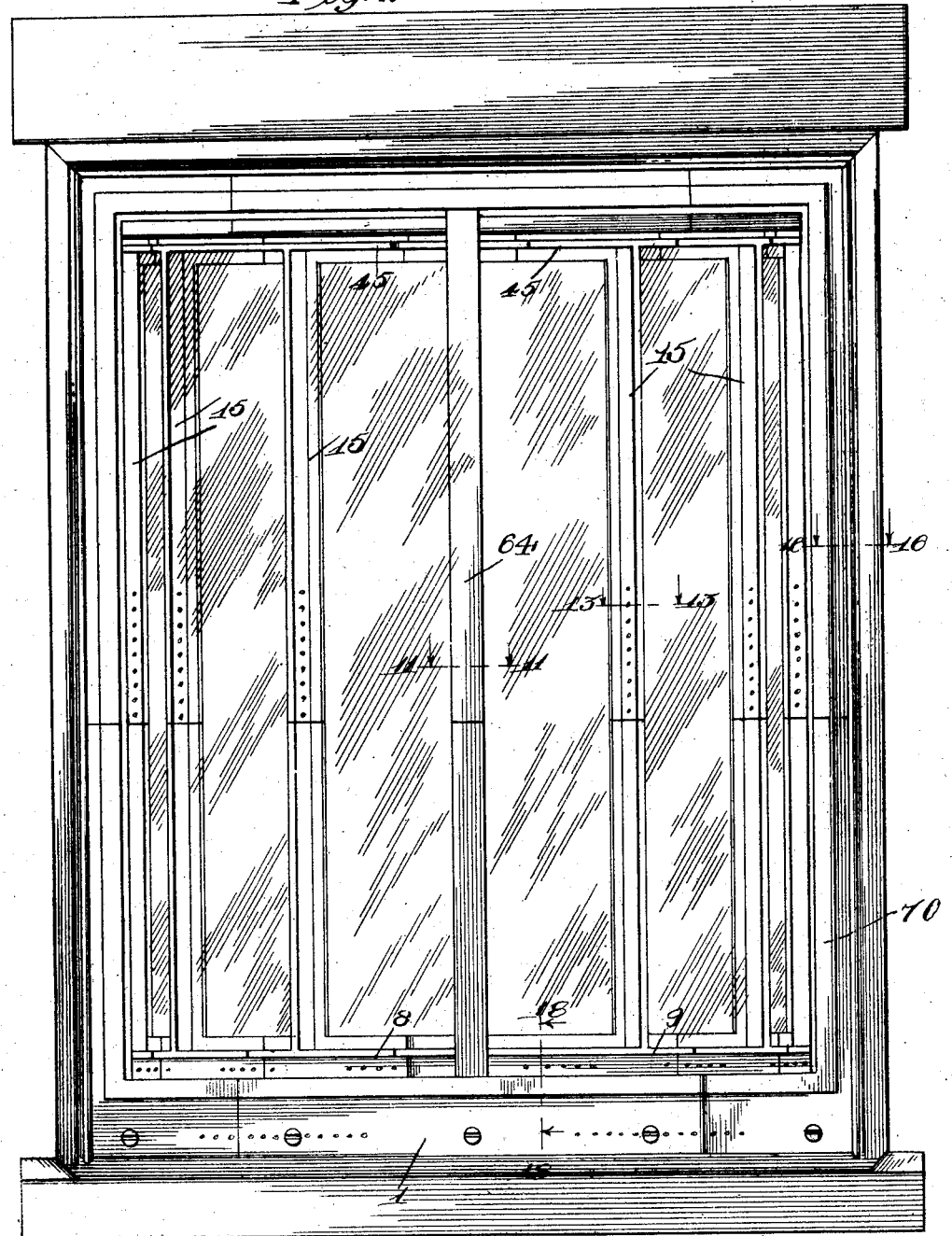

No. 854,055. PATENTED MAY 21, 1907.
L. G. QUACKENBOSS.
DETACHABLE BAY WINDOW.
APPLICATION FILED JUNE 22, 1904.

5 SHEETS—SHEET 3.

Witnesses:
Inventor:
Leonard G. Quackenboss
by Attorneys

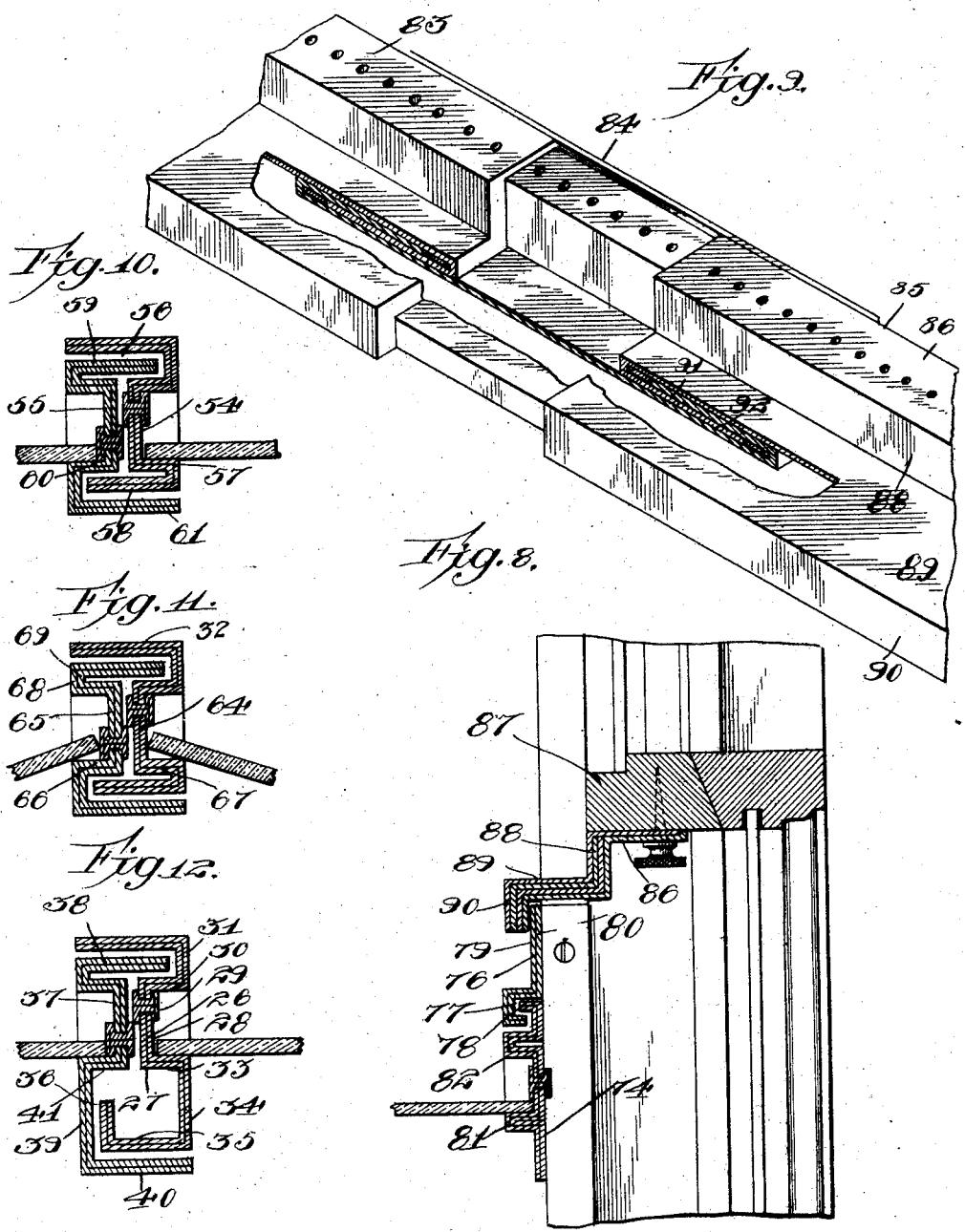

No. 854,055. PATENTED MAY 21, 1907.
L. G. QUACKENBOSS.
DETACHABLE BAY WINDOW.
APPLICATION FILED JUNE 22, 1904.
5 SHEETS—SHEET 5.
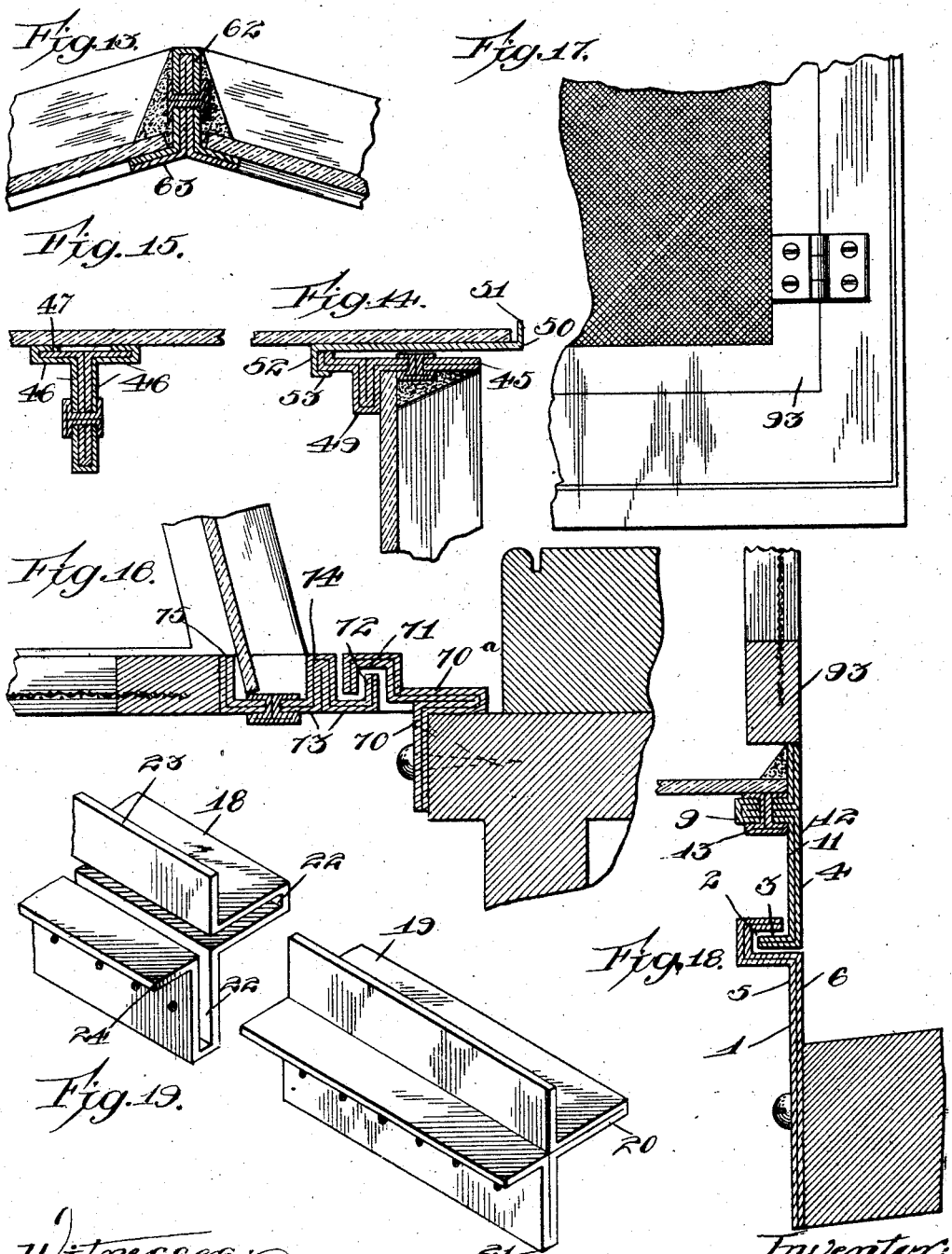

UNITED STATES PATENT OFFICE.

LEONARD G. QUACKENBOSS, OF CHICAGO, ILLINOIS.

DETACHABLE BAY-WINDOW.

No. 854,055.　　　Specification of Letters Patent.　　　Patented May 21, 1907.

Application filed June 22, 1904. Serial No. 213,712.

*To all whom it may concern:*

Be it known that I, LEONARD G. QUACKENBOSS, a citizen of the United States, residing at Chicago, in the county of Cook and State of Illinois, have invented new and useful Improvements in Detachable Bay-Windows, of which the following is a full, clear, concise, and exact description, reference being had to the accompanying drawing, forming a part of this specification.

My invention relates to a detachable expansible structure adapted to be attached to the frame of ordinary windows or to such of the openings in a structure as may be desired, my object being to provide an improved device of this character, which may be adjusted as regards width, height or projection to fit windows of various sizes.

A further object of my invention is to provide a structure which shall be practically weather proof, and, furthermore, which shall be so constructed as to be readily placed in position by unskilled persons.

A further object of my invention is to provide an expansible structure which may be cheaply manufactured, and the parts of which may be kept in stock, so that they may be immediately supplied. This expansible structure may be constructed of any desired shape, as square, octagonal, or semi-circular. I preferably show in the accompanying drawings a dodecagonal bay with the floor, sides and roof formed of glass. I use the term bay as applied to any window, case, box, or platform where this expansible construction may be employed.

Figure 6:
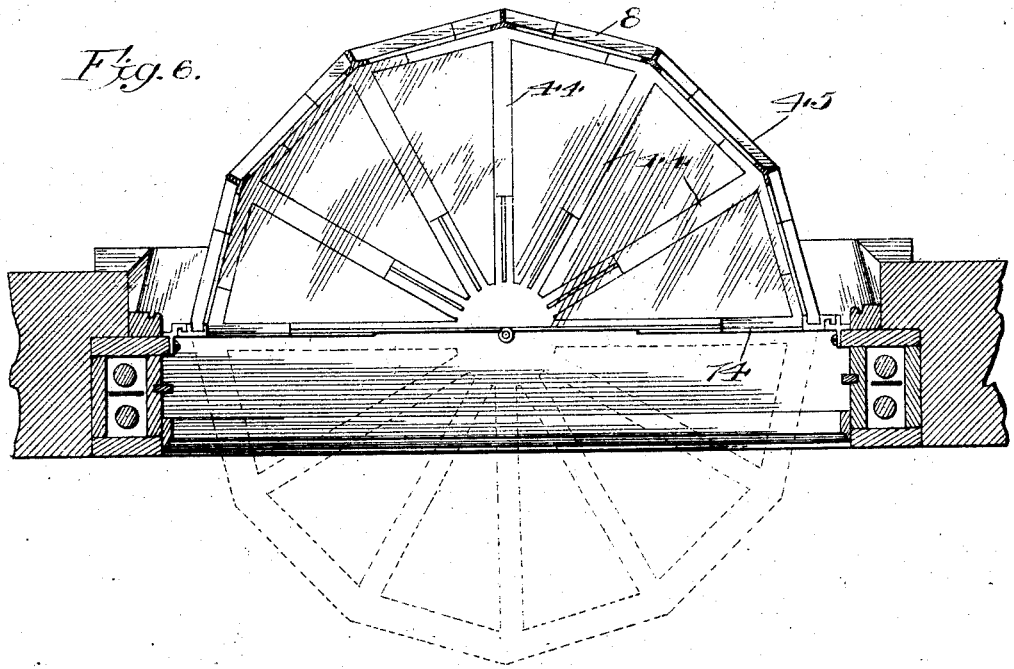
Figure 7:
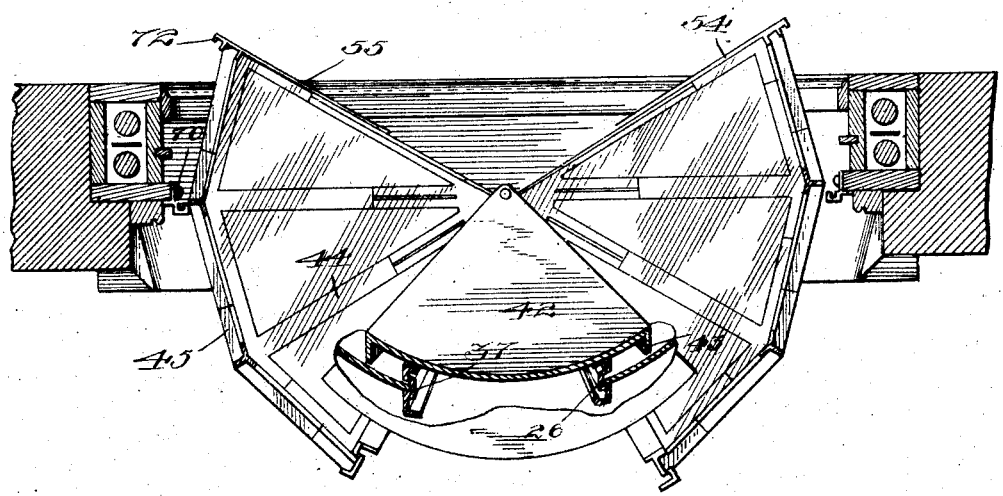

In said drawings, showing the preferred embodiment of my invention, Figure 1 is a front elevation of my bay; Fig. 2 is a bottom plan view thereof; Fig. 3 is a top plan view; Figs. 4 and 5 are detailed views of the vertical ribs of the frame work of my bay; Fig. 6 is a plan view of a modification; Fig. 7 is a plan view showing the parts partially open, and showing my supplemental platform with a portion broken away, thereby exposing a sectional view; Fig. 8 is a sectional view showing my extensible flashing strip; Fig. 9 is a partial detail perspective of my extensible flashing strip with parts broken away, thereby showing a longitudinal section and exposing the construction thereof; Fig. 10 is a section taken on the line 10—10 of Fig. 3; Fig. 11 is a section taken on the line 11—11 of Fig. 1; Fig. 12 is a section taken on the line 12—12 of Fig. 2; Fig. 13 is a section taken on the line 13—13 of Fig. 1; Fig. 14 is a section taken on the line 14—14 of Fig. 3; Fig. 15 is a sectional view of a modification of my radial ribs; Fig. 16 is a section taken on the line 16—16 of Fig. 1; Fig. 17 is a partial detailed view, showing the application of fly screens to my bay; Fig. 18 is a section taken on the line 18—18 of Fig. 1; and Fig. 19 is a detailed perspective view of the bottom outside cross ribs of my frame.

Any suitable and convenient manner of fastening the extending parts together may be employed.

As shown in Fig. 18, I preferably provide a bottom frame rail 1, having a channel portion 2, formed therein for the reception of the flange 3 of the bottom inside rib 4, of the bay. This rail 1, may be secured to the sub-sill of the window or otherwise placed at the lower part of the opening where it is desired to locate the bay. The rail 1 is formed preferably of pieces 5 and 6, which are adapted to telescope or move upon one another, whereby proper adjustment may be had for windows or openings of various widths. I have here shown my bay as pivoted at the top and bottom of the frame work, but it will be understood that I do not wish to limit myself to arranging the structure in this particular manner, as the same may be pivoted, or hinged, to the sides of the opening, or secured in any other suitable manner.

As shown in Figs. 1, 2, 3 and 7, my device preferably consists of a frame of two sections, each section being formed of a separate frame work. In Fig. 2 I have shown a bottom plan view, which illustrates the construction of the lower portion of my device. Each section of the bottom portion of my structure, as here shown, are hinged or pivoted at the center, preferably upon the bottom frame rail 1, and is preferably formed with the radiating ribs 7, 7. These ribs have cross outside ribs 8, 8, which are formed integrally therewith and connect the ribs together, forming a bottom frame work. The bottom inside rib 4, 4 of the bay also serves as a rib in this frame work and it will be noted that the same is formed with an outwardly extending flange 9, upon which rests the inner edge of the glass plate 10, which serves as a filling between the skeleton formed by the ribs. It will be noted that this bottom inside rib 4 is, as here shown, formed of two portions 11 and 12, which are adapted to telescope or move upon one another for the purpose of adjustment and are held together by suitable fastenings 13, passing through the flange 9. The radial ribs 7, 7, are preferably of the construction shown in Figs. 4 and 5, having the outwardly extending flanges 14 and a downwardly extending flange 15. These ribs, as here shown, are formed of two sections and the flange 15, on one rib, is adapted to fit within a channel 16, formed on the other rib, whereby the two may be telescoped upon one another and have a longitudinal adjustment. Suitable openings 17 are formed in the flanges 15 and fastenings passing therethrough serve to hold the two portions together.

The bottom outside cross ribs 8 are formed substantially as shown in Fig. 19, where the same is shown in two portions 18 and 19. The portion 19 having horizontal flanges 20, and the vertical flanges 21, said flanges being adapted to fit within channels 22, formed in the portion 18, whereby the two pieces will be adapted to telescope or move upon one another. By this formation of the channels 22, vertical flanges 23, and horizontal flanges 24, which correspond to the flanges of the portion 19, is secured a construction by which I am enabled to support the ends of the bottom glass or filling, upon the horizontal flange, as well as the vertical glass, the same held, by suitable fastenings, in position against the vertical flanges 21 and 23. In this manner, the sections of glass forming the bottom and the sections of glass forming the sides of my structure are held in position.

It is desirable, when the device is formed in two segments, that where the junction is made between the same, a weather proof joint should be made between the same, and to accomplish this result I have formed the lock ribs in the two segments which adjoin substantially as shown in Fig. 12. The rib 26, it will be noted, is here shown as formed of two parts 27 and 28, constructed substantially the same with the exception that one part is smaller than the other to enable the portions to telescope or move upon one another, and thereby to be adjustable. The two parts are held together and in their different positions by fastenings 29. These two parts are formed, as shown, having the outwardly extending portion 30, the upwardly extending portion 31, and the inwardly extending portion 32, on the upper side, and on the lower side thereof having the outwardly extending portion 33, the downwardly extending portion 34 and the inwardly extending portion 35, which is turned up as shown at 36. The opposite rib 37 is also here shown as constructed of two parts adapted to telescope upon one another and is provided with the inwardly extending portion 38, which fits between the portions 30 and 32 of the rib 26, and with the downwardly extending portion 39, having the inwardly extending portion 40, which is adapted to fit over the portion 35. The rib 37 also has a flange 41 and upon the portion 33 and the flange 41 are adapted to rest the glass panels forming the bottom. In this manner, the two portions are adapted to securely fit together.

Pivoted, or otherwise secured when necessary, in the bottom of the bay, comprising in this case, the bottom inside rib 4, the bottom lock rib, Fig. 12, the bottom outside cross ribs 8 and the radially extending ribs 7, between and over which are adapted to be placed the suitable glass panels, or other filling, is a supplemental bottom 42, as shown in Fig. 7, which is shown as substantially V-shaped, and is here shown as pivoted at its apex. This supplemental bottom is formed with the downwardly extending flanges 43, which fit over and engage the ribs 26 and 37. In this manner when either, or both, of the two sections are partially opened, the space between the same will be filled by the section 42 and the floor space will be greatly increased.

The top portion of my device is also here shown as formed in two sections and as shown in Fig. 3, comprises the top inside rib 74, the top lock rib 54, the radially extending ribs 44, having the top outside cross ribs 45, integrally formed therewith. The ribs 44 are formed substantially as the bottom ribs 7, and in Fig. 15 I have shown a modification thereof, in which the horizontal flanges 46 and 46, upon which the top plates of glass or other filling may rest, have inturned portions 47 for strengthening, and enforcing the combination of the ribs. It is obvious that this modification Fig. 15 is also applicable to the construction of the bottom radial ribs 7 and also to the construction of the vertical ribs shown in Fig. 13. The top radial ribs 44 are adapted to be made of portions which telescope or move upon each other in order that a longitudinal adjustment may be had. The top outside cross ribs 45 are constructed substantially as shown in Fig. 14, having the downwardly extending flanges 49, against which the vertical plates of glass or other filling are adapted to rest and be held in position by any suitable securing means. These top outside cross ribs, it will be noted, are also formed of portions adapted to telescope or move upon one another, whereby a suitable adjustment may be had. The outer ends of the top plates of glass are adapted to rest upon these top outside cross ribs and when necessary to do so, are held in position by clamps 50, having the upwardly extending portion 51 and the downwardly extending portion 52 and inwardly extending portion 53, the latter mentioned portions are adapted to fit over the inner side of the top outside cross ribs and the upwardly extending portion 51 is adapted to fit over the outer edge of the top plates of glass and thereby hold the same in position. In order to form a weather-proof junction between the two sections of the top piece, I provide the two ribs 54 and 55, which are constructed substantially as shown in Fig. 10. These ribs, as are all other parts of my bay, are constructed of portions which are adapted to telescope or move upon one another to permit a longitudinal adjustment, and the rib 54 has formed therein a channel 56 on its uuper side, and has formed on its lower side an outwardly projecting portion 57, and an inwardly projecting portion 58. The rib 55 has formed on the upper side thereof an inwardly projecting portion 59 adapted to fit within the channel 56 of the rib 54 and has at its lower end an outwardly projecting portion 60, and an inwardly projecting portion 61, which form a channel into which the portion 58 is adapted to fit. The portions 57 and 60 form flanges upon which are adapted to rest the edges of the top glass plates. This manner of constructing the two adjoining ribs, so that they fit together, as described, forms a weather-proof joint, and it will be noted that the same effectually prevents the entrance of rain or moisture therethrough.

The top portion may also have secured above the same a supplemental top of the same general construction as the supplemental bottom 42, and the flanges formed on the supplemental top and bottom portions will engage the center floor strips, and the upper projection on the center roof strips, and carry the supplemental top and bottom to cover the space formed by opening the two sections, the supplemental top serving as a shelter.

As here shown in Fig. 1, extending between the cross pieces 45 and 8 are suitable upright supports or ribs, between which are adapted to be supported suitable panes of glass or other filling. These supports, or upright ribs, are constructed substantially as shown in cross section in Fig. 13, having the outwardly extending portions 62 and the flanges 63. These ribs are also formed of portions telescoping, or moving, upon one another, thereby permitting an adjustment to any length required. It will be noted that these upright ribs are constructed substantially as are the radial ribs of the top and bottom portions with the exception that the flanges 63, instead of being at right angles to the portion 62, are here shown as bent to form an obtuse angle. In this manner, the flanges 63 may have the same angle as the plates of glass, or other filling, and will not rest at an angle thereto. The adjacent upright lock ribs of the two sections are, however, formed substantially as shown in Fig. 11, in order that the two may fit together and form a weather-proof joint therebetween when the two sections are closed. These two ribs 64 and 65 are formed substantially the same as the two adjoining top ribs, which have been previously described, and the glass plates, or other filling, may rest against the flanges 66 and 67 and be held in position by putty, or other suitable means. These central ribs are also shown as formed of portions 68 and 69, which telescope or move upon one another in order that the same may be adjusted to any length desired.

It will be noted that the bottom, top and upright lock ribs, Figs. 10, 11 and 12, may be constructed to miter into each other at bottom and top intersection and in such case, form a very solid and strong construction.

Contemplating various modifications the structure may be formed in one section, as shown in Fig. 6, and in this construction it is obvious that it would be unnecessary to provide the adjoining central lock ribs formed in two sections as previously described. Secured at each side of the window frame, preferably to the blind stop, as here shown in Fig. 16, are vertically extending angular frame rails 70, having formed therein a channel 71, into which is adapted to engage the inwardly projecting portion 72; formed on the inside vertical rib 73 of the bay. As window frames are often built into the walls out of true, that is, twisted within themselves, it is desirable to arrange for properly placing the vertical frame rails 70, so that they may be plumb and be at right angles to the bottom and top horizontal frame rails 1 and 76, which should be placed level. This I propose to provide for, when the bay is attached to the blind stops of the window frame, as here shown, by the use of proper filling to re-inforce the blind stop and make plumb the vertical frame rails 70. The vertical frame rails 70 may be provided with a flange 70ª, as shown in Fig. 16, which would fit outside of the blind stop, as shown, and effectually close any aperture, caused by the placing of said filling or re-inforcement, between the blind stop and the vertical frame rail 70, and make the connection between the same weather-proof. The vertical frame rail 70 may be suitably secured by screws, which pass through the openings therein and into the blind stop and may also pass through the filling wherever it may be placed. By this arrangement, it will be noted that the vertical frame rails may be readily secured from the inside and thereby avoid the necessity of working on the outside of the window. The vertical frame rails 70 on each side of the bay are formed of portions adapted to telescope or move upon one another, as shown, in order that the same may be adjusted to any length desired. The vertical inside ribs 73 of the bay, it will be noted, are of peculiar structure, having formed thereon the projection 72, which is adapted to fit within the channel 71, and the projection 74, which, in conjunction with the projection 75, form a channel for the reception of the ends of the plate glass, or other panel, the glass plate resting against the projection 75 and being held in suitable position by a filling of putty placed between the plate and the projection 74, or by other suitable means. These vertical inside ribs of the bay are formed of parts which telescope or move upon one another and thereby form ribs which are extensible.

In order that a weather-proof joint may be made between the top of the bay and the top of the window or opening in the building, I extend across, at the head of the window, a top frame rail 76, having the channel 77 formed therein, in which is adapted to fit the outwardly extending portion 78 of the inside top rib 74 of the bay. This top frame rail 76 is formed of parts 79 and 80, which are adapted to telescope, or move, upon one another, whereby the rib may be extended to any length desired.

The inside top rib 74 of the bay has formed thereon a flange 81, upon which is adapted to rest the inner edge of one of the top glass panels, or other desirable material, a suitable filling being interposed, if desired, between the glass and the top flange 82 formed on the rib 74 for holding the glass in position. This inside top rib 74 is also formed of portions which are adapted to telescope, or move, upon one another in order that the same may be adjusted to any length desired.

In the drawings, I have shown the top frame rail 76 as attached with a modification of my device, but it will be understood that when the same is used without the modification, it can be extended across at the head of the window frame, or to the height of a possible transom bar, instead of midway, as shown in Fig. 8. When it is desired to use my bay in a smaller form, as regards height, and only upon the lower portion of the window, I provide an extensible flashing strip, as shown in Figs. 8 and 9. This flashing strip, as shown, is composed of sectional parts, as are all the other ribs and portions of the expansible bay in order that the same may be adjustable. As here shown, this strip is composed of three parts 83, 84 and 85, all having the inwardly extending portion 86, which is adapted to be screwed to or otherwise secured at the meeting rail 87, of the upper sash of the window, and the downwardly extending portion 88, the outwardly extending portion 89, and the downwardly extending portion 90, the downwardly extending portion 90 being adapted to fit or extend over the top frame rail 76. The portion 84, which, as here shown, constitutes the central portion of the flashing strip, is provided with an inturned portion 91, as shown in Fig. 9 in the broken away portion, and this portion 91 is adapted to fit within a channel formed on the end of the two portions 83 and 85, of the strip. In this way, I am enabled to provide a flashing strip which may be readily adjusted to different sized openings, to serve the purpose of closing the space between the top frame rail 76 and the meeting rail of the upper sash, and which is also perfectly weather tight at the points where the different portions thereof join. By disconnecting the expansible flashing strip and removing the same from position, a free and unobstructed movement in lowering the upper sash is permitted.

It is often desirable that the window or other opening in the apartment should be protected by insect screens, and if desired, my device may be provided with screens, which may extend between the top inside ribs 74, the bottom inside ribs 4 and the vertical inside ribs 73 of the bay. These screens preferably comprise a frame 93, as shown in Figs. 17 and 18, into which suitable screening may be secured. By arranging a screen, hinged, as here shown, or otherwise secured, in each of the two sections of the bay, each screen extending from the vertical inside rib 73 to the center of the bay, and from the bottom inside rib 4 to the top inside rib 74, the screens will always close the opening in the bay no matter in what position the two sections of the bay may be swung, as the two inner edges of the frame 93 of the screen will meet at the pivoted center portion and there will be no opening formed, even though the sections assume the position shown in Fig. 7.

By thus constructing my device in the expansible manner, it will be noted that all the parts forming the frame work thereof may be readily adjusted and placed in position. By this arrangement I provide an expansible structure which can be properly adjusted to fit any sized window or opening where it is desired to place the same, and all the parts of which can be kept in stock for immediate use.

As it is evident that my invention admits of various modifications, which will readily suggest themselves to those skilled in the art and may be made in the structure of my invention without departing from the spirit thereof, I do not wish to limit myself to the particular construction shown and described.

While I have shown and described my device as being constructed to be adjustable, it will be understood that I do not wish to limit myself to this particular feature, as the same may be constructed without the extensible joints shown in the drawings.

Having thus described my invention what I claim as new and desire to secure by Letters Patent is:

1. A detachable bay comprising an expansible frame and panels supported in said expansible frame.

2. A detachable bay adapted to be secured within an opening, comprising an expansible frame and panels supported in said expansible frame.

3. In a bay, the combination with a frame, comprising top and bottom ribs having suitable cross ribs at the ends thereof and vertical ribs extending between said top and bottom cross ribs, of suitable panels supported in said frame.

4. In a structure, the combination with a frame, comprising top and bottom ribs having suitable cross ribs at the ends thereof and vertical ribs extending between said top and bottom cross ribs, of suitable panels supported within said frame, said ribs being formed of parts which telescope or move upon one another.

5. The combination with a detachable structure, comprising an expansible frame and panels supported in said frame, of extensible rails adapted to be fitted within an opening and support said structure.

6. The combination with a detachable structure, comprising an expansible frame and suitable panels supported in said frame, of extensible rails adapted to be fitted within an opening and support said structure, said rails comprising pieces formed of parts adapted to telescope or move upon one another.

7. A bay, comprising a frame, supporting panels therein, and formed of sections arranged to be secured within an opening, said sections being interlocking at their junctures to form a weather-proof joint between the sections.

8. In a structure, the combination with a suitable frame formed in sections, comprising extending top and bottom ribs having suitable cross ribs at the ends thereof and vertical ribs extending between said top and bottom cross ribs, of suitable panels supported between said ribs, the adjoining ribs of the sections being adapted to interlock with each other, whereby a weather-proof joint between the sections may be formed.

9. In a structure, the combination with adjustable rails, of a structure comprising an adjustable frame and panels adapted to be supported within said frame, and an extensible flashing strip adapted to be secured at the meeting rail of the window sash and engage the top of said rails.

10. The combination with adjustable rails, of a structure comprising an adjustable frame and suitable panels supported within said frame, said structure having parts which interlock with said rails, whereby a weather-proof juncture is made between the same.

11. The combination with a structure, comprising a frame formed of sections and panels supported in said frame, of a supplemental top and bottom adapted to cover the opening formed between the top and bottom of said sections when the same are partially open.

12. The combination with a structure, comprising a frame formed of sections secured in an opening, of a supplemental top and bottom having downwardly extending portions adapted to engage the top and bottom of each section, whereby when the sections are opened the supplemental top and bottom will be moved into a position to close the opening formed between said sections.

13. A rotatable structure adapted to be secured in an opening and comprising an adjustable expansible frame and suitable panels supported within said frame.

14. The combination with a plurality of extensible rails adapted to be fitted in an opening, of an expansible structure suitable to adjustment as to width, heighth or projection, having parts interlocking with said rails.

15. A bay, comprising a supporting frame arranged to be placed in an opening, and a second frame forming the bay having parts interlocking with said supporting frame to form a weather-proof juncture between said frames.

16. A bay, comprising a supporting frame arranged to be secured within an opening, a structure formed in sections supported in said frame, said section having adjoining ribs interlocking with each other to form a weather-proof joint between the sections.

17. The combination with a bay formed of sections pivoted at one corner in an opening, of screens secured to one of the sides of each section and extending from the free end of said section to the pivoted end.

18. The combination with a bay having substantially quadrangular sections, of screens secured to one of the straight sides of each section.

19. The combination with a bay having substantially quadrangular sections pivoted in an opening, of screens secured to one of the straight sides of each section.

20. The combination with an expansible bay having substantially quadrangular sections, of screens secured to one of the straight sides of each section.

In witness whereof, I have hereunto subscribed my name in the presence of two witnesses.

LEONARD G. QUACKENBOSS.

Witnesses:
M. R. ROCHFORD,
W. PERRY HAHN.